(12) United States Patent
Liu et al.

(10) Patent No.: US 12,096,862 B2
(45) Date of Patent: Sep. 24, 2024

(54) HANGING STRUCTURE FOR SEATING FOAM

(71) Applicant: Yanfeng International Automotive Technology Co., Ltd., Shanghai (CN)

(72) Inventors: Yanfei Liu, Shanghai (CN); Wei Xu, Shanghai (CN); Ren Tang, Shanghai (CN); Wenhui Ma, Shanghai (CN)

(73) Assignee: Yanfeng International Automotive Technology Co., Ltd., Shanghai (CN)

( * ) Notice: Subject to any disclaimer, the term of this patent is extended or adjusted under 35 U.S.C. 154(b) by 279 days.

(21) Appl. No.: 17/761,661

(22) PCT Filed: Aug. 13, 2020

(86) PCT No.: PCT/CN2020/108771
§ 371 (c)(1),
(2) Date: Mar. 18, 2022

(87) PCT Pub. No.: WO2021/036792
PCT Pub. Date: Mar. 4, 2021

(65) Prior Publication Data
US 2022/0330704 A1   Oct. 20, 2022

(30) Foreign Application Priority Data

Aug. 30, 2019 (CN) .......................... 201910816373.9

(51) Int. Cl.
*B60N 2/58* (2006.01)
*A47C 7/02* (2006.01)
(Continued)

(52) U.S. Cl.
CPC ............ *A47C 7/029* (2018.08); *B60N 2/5825* (2013.01); *B60N 2/6018* (2013.01); *A47C 7/24* (2013.01); *A47C 7/26* (2013.01)

(58) Field of Classification Search
CPC .. A47C 7/029; A47C 7/24; A47C 7/26; B60N 2/5825; B60N 2/6018; B60N 2/686
See application file for complete search history.

(56) References Cited

U.S. PATENT DOCUMENTS 3,630,572 A * 12/1971 Homier ................ A47C 31/026
297/452.52
4,558,905 A * 12/1985 Natori ................ B64D 11/0647
297/452.6
(Continued)

FOREIGN PATENT DOCUMENTS

CN 202557363 U 11/2012
DE 19949423 C1 1/2001
(Continued)

OTHER PUBLICATIONS

Extended European Search Report dated 06.09.2023 for EP Application No. 20856178.7 (7 pages).
(Continued)

*Primary Examiner* — Rodney B White
(74) *Attorney, Agent, or Firm* — Merchant & Gould P.C.

(57) ABSTRACT

Disclosed is a fastening structure for a seating foam, comprising a foam and a reinforcement fabric, and characterized in that the fastening structure is directly provided at a reinforcement fabric at a location corresponding to a fastening position, and is connected to the reinforcement fabric. The fastening structure of the present invention simultaneously meets two functional requirements of a foam, namely reinforcement of a side B of the foam and fastening of an exterior side A of the foam. The novel fastening structure of the present invention saves space, is thin and light, enhances the strength of the foam against a pull-out force, and optimizes a foam production process.

15 Claims, 19 Drawing Sheets

(51) Int. Cl.
   *B60N 2/60*   (2006.01)
   *A47C 7/24*   (2006.01)
   *A47C 7/26*   (2006.01)

(56) References Cited

U.S. PATENT DOCUMENTS

| | | | | |
|---|---|---|---|---|
| 4,606,580 | A * | 8/1986 | Yoshizawa | B60N 2/5825 297/DIG. 2 |
| 4,673,542 | A | 6/1987 | Wigner et al. | |
| 4,718,718 | A * | 1/1988 | Maruyama | B60N 2/5825 297/180.12 |
| 4,865,383 | A * | 9/1989 | Sbaragli | B60N 2/5825 297/218.2 |
| 4,927,209 | A * | 5/1990 | Maruyama | B60N 2/5825 297/180.12 |
| 5,733,001 | A * | 3/1998 | Roberts | B60N 2/5825 24/297 |
| 7,017,997 | B2 * | 3/2006 | Takezawa | B60N 2/5825 297/452.6 |
| 7,481,489 | B2 * | 1/2009 | Demick | B60N 2/5825 297/218.1 |
| 7,559,100 | B2 * | 7/2009 | Pedde | F16B 5/0692 24/584.1 |
| 7,708,343 | B2 * | 5/2010 | Kayumi | B60N 2/914 297/452.41 |
| 8,240,759 | B2 * | 8/2012 | Hobl | B60N 2/5825 297/452.59 |
| 8,919,878 | B2 * | 12/2014 | Sakamoto | B60N 2/5825 297/452.59 |
| 8,974,004 | B2 * | 3/2015 | Sakamoto | B60R 21/207 297/218.1 |
| 9,409,499 | B2 * | 8/2016 | Funaki | B60N 2/70 |
| 9,669,744 | B2 * | 6/2017 | Cao | B60N 2/4249 |
| 9,701,228 | B2 * | 7/2017 | Takahashi | B60N 2/643 |
| 9,789,796 | B1 * | 10/2017 | White | B60N 2/5642 |
| 10,773,619 | B1 * | 9/2020 | Hamlin | B60N 2/6027 |
| 11,254,250 | B2 * | 2/2022 | Noguchi | A47C 7/18 |
| 11,724,626 | B2 * | 8/2023 | Aoki | F16B 2/20 297/452.6 |
| 11,759,025 | B2 * | 9/2023 | Chinomi | A47C 31/023 297/452.55 |
| 2002/0117882 | A1 * | 8/2002 | Takezawa | B60N 2/5825 297/218.1 |
| 2012/0174352 | A1 * | 7/2012 | Tsunoda | B60N 2/5825 24/530 |
| 2015/0328808 | A1 * | 11/2015 | Sasaki | B60N 2/5825 264/46.4 |
| 2016/0129818 | A1 * | 5/2016 | Sahashi | B60N 2/5825 297/452.61 |
| 2016/0280105 | A1 * | 9/2016 | Sato | B60N 2/5825 |
| 2016/0280106 | A1 * | 9/2016 | Sato | B60N 2/5825 |
| 2017/0008436 | A1 * | 1/2017 | Wyatt | B60N 2/5825 |
| 2018/0345832 | A1 * | 12/2018 | Kumagai | B60N 2/56 |
| 2021/0053472 | A1 * | 2/2021 | Eldridge | A47C 31/023 |

FOREIGN PATENT DOCUMENTS

| | | |
|---|---|---|
| DE | 10113960 A1 | 10/2002 |
| DE | 1020005002690 A1 | 7/2006 |

OTHER PUBLICATIONS

PCT International Search Report for PCT Application No. PCT/CN2020/108771 mailed Nov. 13, 2020 (7 pages, with English translation).
PCT Written Opinion for PCT Application No. PCT/CN2020/108771 mailed Nov. 13, 2020 (11 pages, with English translation).
PCT International Preliminary Report on Patentability for PCT/CN2020/108771 mailed Mar. 1, 2022 (13 pages, with English translation).
Chinese Office Action for CN Application No. 201910816373.9 mailed Jan. 5, 2021 (19 pages, with English Translation).
Chinese Office Action for CN Application No. 201910816373.9 mailed May 18, 2021 (15 pages, with English Translation).
Chinese Office Action for CN Application No. 201910816373.9 mailed Jan. 10, 2022 (13 pages, with English Translation).

* cited by examiner

Soldering device

HANGING STRUCTURE FOR SEATING FOAM

CROSS-REFERENCE TO RELATED APPLICATIONS

This application is a National Stage Application of PCT/CN2020/108771, filed 13 Aug. 2020, which claims priority to Serial No. 201910816373.9, filed 30 Aug. 2019, and which applications are incorporated herein by reference. To the extent appropriate, a claim of priority is made to the above disclosed applications.

TECHNICAL FIELD

The present invention relates to the technical field of seat production, in particular to a hanging structure for a seat foam.

BACKGROUND OF INVENTION

FIG. 1 shows a known seat foam arrangement, wherein both inserts for an A side of a foam 1, such as a steel wire 2 and a hook-and-loop belt 4, and inserts for a B side of the foam 1, such as a reinforcement fabric 3 (in some cases a reinforcement block, a support steel wire, and a hanging steel wire may be additional inserts) are separate parts, which are placed and held in a foaming tool during production and are combined through a foaming process.

Such seat foam arrangement may have the following problems during production:

1. The shape of the known foam is complex, and a large number of various parts should be placed in a foaming tool during production, and thus the production tempo and the production efficiency are limited.

2. Steel wires as inserts are stacked in a shelf. End regions of the steel wires may be tangled, so that the steel wires can't be separated from each other easily during production.

3. With a poor joining force between a hanging steel wire and a foam, it is likely that the steel wire may be pulled out from the foam during rework.

4. Steel wires to be embedded in foams need surface treatment, such as galvanizing or black finishing, which results in an increased cost.

5. A large number of magnetic parts are needed for positioning a reinforcement fabric during foaming production, which results in an increased cost.

6. Some seats have a thin and light style. Due to limitation by the shape and the frame layout of these seats, these seats have not enough space for arranging a conventional hanging structure.

7. A local area of a foam may have an insufficient thickness and thus has not enough space for arranging a hanging structure. It's known in the prior art, a hanging steel wire may be bent, or a short hanging steel wire may be used and meanwhile more hook-and-loop belts or the like are used, which results in an increased cost.

8. When separate spatially shaped steel wires are used, rotation-resistant means and misalignment prevention means should be provided, however, the additional rotation-resistant means and misalignment prevention means increase the structural complexity of a foaming tool and the operation time of the foaming tool during production.

SUMMARY OF INVENTION

An object of the present invention is to provide a hanging structure for a seat foam with a simple structure and a low cost for addressing a defect of a foam hanging structure in the prior art.

The object of the present invention may be realized by the following technical solution:

A hanging structure for a seat foam, comprising a foam and a reinforcement fabric, characterized in that the hanging structure is directly provided on the reinforcement fabric at a hanging position.

In an optional embodiment of the present invention, the hanging structure is arranged at a side of the reinforcement fabric facing a B side of the foam and is associated with a fixing point of a trim cover.

In an optional embodiment of the present invention, the hanging structure protrudes from the side of the reinforcement fabric facing the B side of the foam, and extends towards an A side of the foam.

In an optional embodiment of the present invention, the hanging structure is achieved by a structural design and by setting characteristic parameters, wherein a steel wire is embedded into a reinforcement fabric, and the reinforcement fabric with the embedded steel wire is processed integrally; or is achieved in such a way that a reinforcement fabric with a hanging structure is formed, and then a steel wire is mounted to the formed hanging structure, and is connected with it.

In an optional embodiment of the present invention, the steel wire is embedded in the reinforcement fabric by gluing with an adhesive, or by stitching, or by soldering, or by heat seal.

In an optional embodiment of the present invention, the hanging structure is a prefabricated standard part which is connected with the reinforcement fabric. It is possible to implement hanging systems having various styles and realize a shared platform.

In an optional embodiment of the present invention, the hanging structure passes through the foam and extends into a hanging groove in the foam which opens towards a trim cover.

In an optional embodiment of the present invention, the hanging structure is connected to the trim cover through a "C"-shaped ring or a "J"-shaped hook or a catch.

In an optional embodiment of the present invention, the reinforcement fabric has an area density of greater than 100 g/m².

In an optional embodiment of the present invention, the hanging structure has a positioning groove for precisely positioning the hanging structure in the tool.

In an optional embodiment of the present invention, in correspondence to the positioning groove, a positioning feature is arranged in a foaming tool, wherein the positioning feature may be inserted into the positioning groove, and then the reinforcement fabric may be positioned, so that an accurate position of the hanging structure in the foamed product may be ensured.

In an optional embodiment of the present invention, the positioning feature is held to the foaming tool by a magnet.

In an optional embodiment of the present invention, under consideration of the ductility of the reinforcement fabric per se, the depth of the hanging structure and the forming process, the hanging structure may be designed in a trapezoidal or stepped trapezoidal shape, wherein specific characteristic dimensions may be adapted according to the actual space.

In an optional embodiment of the present invention, the hanging structure is in a shape of "Π" with a horizontal rod and a pair of vertical rods integrally connected with the horizontal rod, wherein free ends of the pair of vertical rods are connected to the reinforcement fabric.

In an optional embodiment of the present invention, the hanging structure comprises a reinforcement fabric, which is directly formed by the reinforcement fabric at the hanging position, and a steel wire embedded in the reinforcement fabric.

In an optional embodiment of the present invention, the reinforcement fabric is provided with a positioning groove for positioning the reinforcement fabric in the tool, wherein the positioning groove opens at a side facing a tool, so that the positioning feature of the tool can be inserted into the positioning groove and position the reinforcement fabric.

In an optional embodiment of the present invention, the steel wire is embedded in the reinforcement fabric, and is associated with a fixing point of a trim cover.

In an optional embodiment of the present invention, the steel wire is embedded in the reinforcement fabric by gluing with an adhesive, or by stitching, or by soldering, or by heat seal.

In an optional embodiment of the present invention, the reinforcement fabric is in a trapezoidal, or stepped trapezoidal, or rectangular, or arched, or parabolic shape.

The above-mentioned technical solutions of the present invention may have the following advantages in comparison with the known hanging structure:

(1) The hanging structures of the present invention meet two functional requirements: reinforcement of the B side of the foam and a good appearance of the side A of the foam due to the hanging effect.

(2) The hanging structures of the present invention may be standardized, wherein both the reinforcement fabrics or the plastic parts and the steel wires may be standardized, wherein the steel wires may be not subjected to surface treatment, and may be not bent spatially, and may be made as standard parts or alternatively as special parts.

(3) The number of the inserts in foam is reduced, wherein no separate steel wire parts or separate reinforcement fabric parts are inserted in the case of the hanging structures the present invention, thereby saving the production management cost, simplifying the production process, and saving the labor, wherein exact one insert may be placed (it isn't necessary to place a plurality of steel wires and thereafter place the reinforcement fabric).

(4) A formed reinforcement fabric as a platform is combined with a hanging structure as a standard part, which allows a plurality of shaping styles and reduction of cost. The standardized platform of the reinforcement fabric may spare steel wires by usage of an extrusion molded part, an injection molded part or a formed standardized feature of the reinforcement fabric.

(5) An ordinary reinforcement fabric is combined with a hanging structure as a standard part, which allows a plurality of shaping styles and reduction of cost.

(6) A hanging structure in a reinforcement fabric may be associated with a positioning structure in a foaming tool, so that the number of magnetic parts for positioning the reinforcement fabric in the foaming tool may be reduced.

(7) A steel wire is embedded in a reinforcement fabric, which effectively solves the problem with respect to the performance of the steel wire resistant to a pull-out force, and thus may ensure a qualified pull-out resistance of the steel wire without rework.

(8) It is possible to save the space and realize the hanging effect for a seat with a light and thin style.

(9) It is possible to reduce the number of magnets for positioning in a foaming tool, and reduce the labor hours of the operation of the tool (in a known foaming tool, both an upper tool part and a lower tool part are embedded with magnets, while in a foaming tool in the present invention, only an upper tool part needs to be provided with positioning magnets.)

(10) Since rotation-resistant means and misalignment prevention means for steel wire may be spared in the present invention, the labor hours in design are reduced.

The hanging structures of the present invention may ensure the pull-out strength by means of the reinforcement fabric, wherein the steel wire may ensure the effect of the assembled trim cover, wherein the requirements on the thickness of the hanging groove may be reduced, wherein the hanging structure for a seat with a light and thin style may be realized. The design of the hanging characteristic parameters in the present invention may spare the space.

EMBODIMENTS

The present invention will be further described below with references to the accompanying drawings and specific embodiments.

Figure 1:
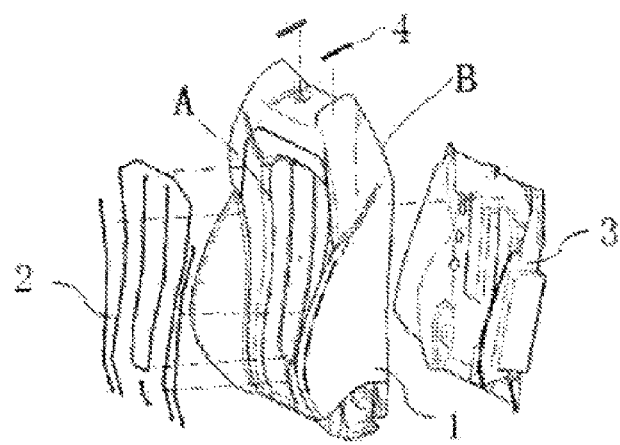
FIG. 1 is an exploded schematic view of a foam of a known seat backrest.
Figure 2:
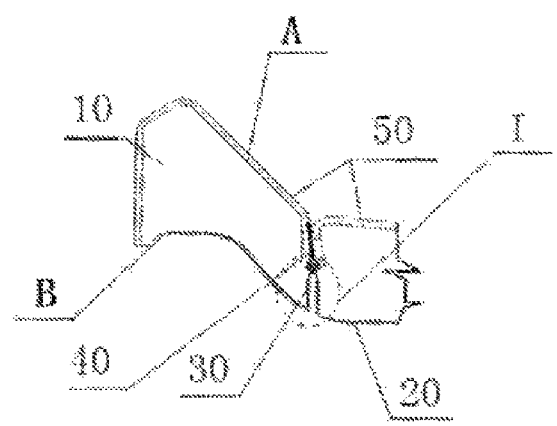
FIG. 2 is a schematic view of an application of a hanging structure of the present invention.
Figure 3:
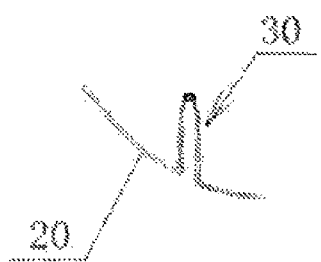
FIG. 3 is an enlarged schematic view of the portion I of FIG. 2.

Referring to FIGS. 2 and 3, a hanging structure for a seat foam as shown comprises a foam 10 and a reinforcement fabric 20. The hanging structure 30 is directly provided on the reinforcement fabric 20 at a side of the reinforcement fabric 20 facing a B side of the foam 10 and is associated with a fixing point of a trim cover 50. The hanging structure 30 tensions the trim cover 50 at an A side of the foam 10 by means of a trim cover tensioning structure 40.

Figure 4:
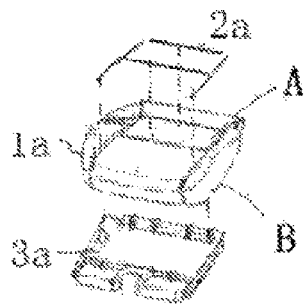
FIG. 4 is an exploded schematic view of a foam of a known seat cushion.

Referring to FIG. 4, in a foaming process of a seat cushion in a conventional solution, a seat cushion steel wire 2a is arranged at an A side of a seat cushion foam 1a, a seat cushion reinforcement fabric 3a is arranged at a B side of the seat cushion foam 1a, wherein the seat cushion steel wire 2a and the seat cushion reinforcement fabric 3a are separate from each other. During the production process, the seat cushion steel wire 2a is placed in a lower tool part, the seat cushion reinforcement fabric 3a is placed in an upper tool part, and then the tool is closed for casting and foaming, so that they are joined with the seat cushion foam 1a.

Figure 5:
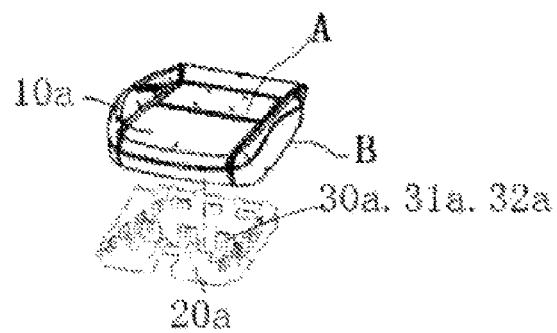
FIG. 5 is a schematic view of an application of a hanging structure of the present invention to a foam of a seat cushion.

The hanging structure 30 of the present invention is achieved by a structure design and by setting characteristic parameters as follow:

Referring to FIG. 5, the hanging structure 30a as shown comprises a reinforcement fabric 31a, which is directly formed by a reinforcement fabric 20a (non-woven or woven fabric) at a side of the reinforcement fabric 20a facing a B side of the foam 10 at a hanging position, and a steel wire 32a embedded in the reinforcement fabric 31a. The steel wire 32a is a straight steel wire segment or a long steel wire. The reinforcement fabric 20a is directly placed in an upper tool part of a tool, and then the tool is closed for casting and foaming, so that it is joined with the foam 10a.

Figure 6:
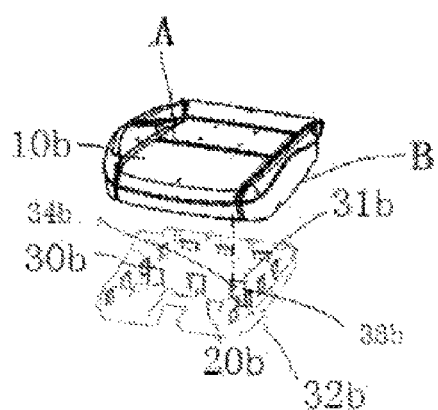
FIG. 6 is a schematic view of an application of another hanging structure of the present invention to a foam of a seat cushion.

Referring to FIG. 6, a hanging structure 30b as shown is a plastic part in a shape of "Π" with a horizontal rod 31b and a pair of vertical rods 32b, 33b integrally connected with the horizontal rod 31b, wherein free ends of the pair of vertical rods 32b and 33b are connected to a side of the reinforcement fabric 20b facing a B side of a foam 10b. The plastic part has a hook hole 34b for connecting trim cover profiles with each other.

Figure 7:
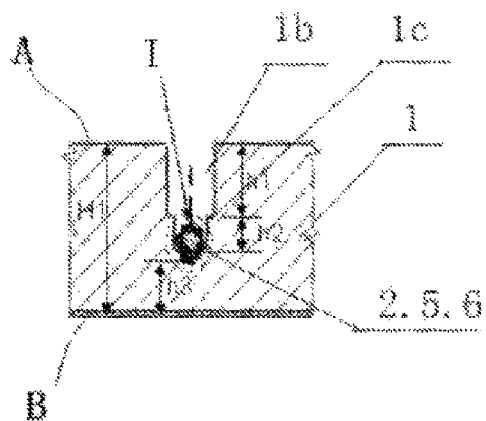
FIG. 7 is a cross-sectional view of a conventional hanging structure+a trim cover profile+a C-shaped ring, wherein the cross section runs through a hanging groove.
Figure 8:
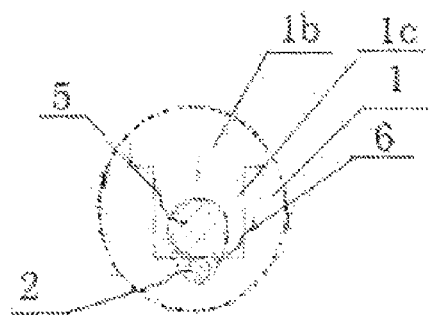
FIG. 8 is an enlarged schematic view of the portion I of FIG. 7.
Figure 9:
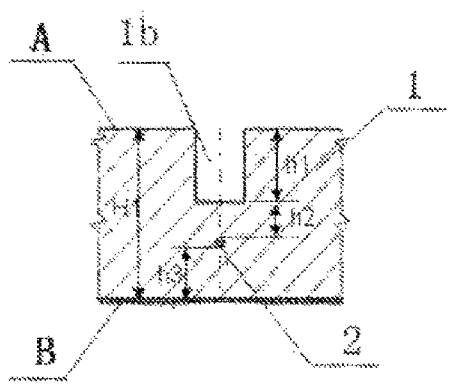
FIG. 9 is a cross-sectional view of a combination of a conventional hanging structure+a trim cover profile+a C-shaped ring, wherein the cross section doesn't run through a hanging groove.

Referring to FIGS. 7 to 9, in a solution of a conventional hanging structure+a trim cover profile 5+a C-shaped ring 6, a hanging groove 1b in a foam 1 has a depth $h1 \geq 15$ mm, where a target value of h1 may be defined according to a specific shape style; a hanging window 1c has a depth $h2 \geq 5$ mm; the minimum distance from a steel wire 2 to a B side of the foam 1 is h3, which is set according to a thickness of the product; a hanging area has a total thickness of $H1=h1+h2+h3$, In order to ensure the hanging effect for the seat assembly, it is recommended that $H1 \geq 37$ mm. The values of foam thicknesses h2 and h3 directly affect the joining strength between the foam and the steel wire 2. The greater the values are, the stronger the resistance to the pull-out force will be, wherein the resistance is decisively dependent on the thickness of the foam portion covering the steel wire 2.

Figure 10:
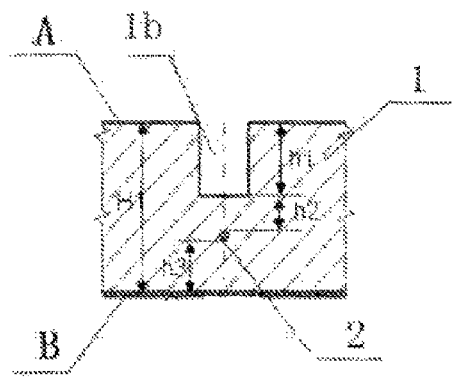
FIG. 10 is a cross-sectional view of a hanging structure+a trim cover profile+a C-shaped ring of the present invention, wherein the cross section runs through a hanging groove.
Figure 11:
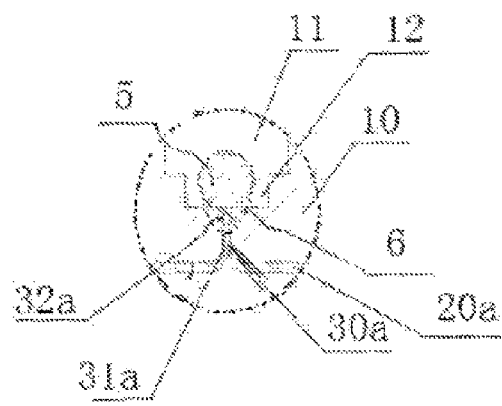
FIG. 11 is an enlarged schematic view of the portion I of FIG. 10.
Figure 12:
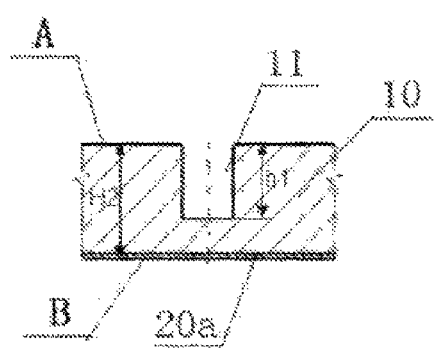
FIG. 12 is a cross-sectional view of a hanging structure+a trim cover profile+a C-shaped ring of the present invention, wherein the cross section doesn't run through a hanging groove.

Referring to FIGS. 10 to 12, in a solution of a hanging structure+a trim cover profile 5+a C-shaped ring 6 of the present invention, a hanging groove 11 in a foam 10 has a distance from a B side of the foam 10, wherein a depth h1 of the hanging groove 11 is the same as that in the conventional solution; a hanging window 12 has a depth h4 of $3 \text{ mm} \leq h4 \leq 8$ mm, wherein h4 is set according to the thickness of the product; the minimum distance from a bottom of the hanging window 12 to the B side of the foam 10 is h5, where h5 is set according to the thickness of the product; a hanging area has a total thickness of $H2=h1+h4+h5$. In order to ensure the hanging effect for the seat assembly, it is recommended that $H2 \geq 25$ mm. The resistance to the pull-out force is achieved by the strength of the reinforcement fabric 31a and the steel wire 32a per se, and substantially has no relation with the depth of the embedment of the steel wire in the foam. As compared with H1, H2 is an optimized design, thereby saving the space whilst improving the resistance to the pull-out force, which is suitable for the layout of a thin and light seat.

Figure 13:
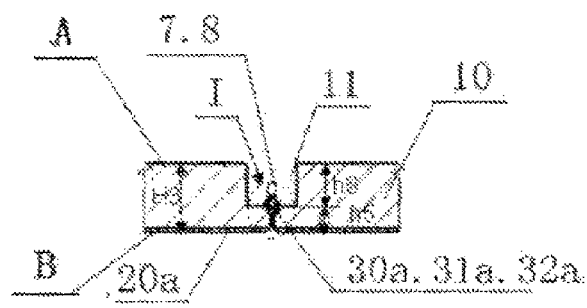
FIG. 13 is a cross-sectional view of a hanging structure+a trim cover fabric bag+a C-shaped ring of the present invention, wherein the cross section runs through a hanging groove.
Figure 14:
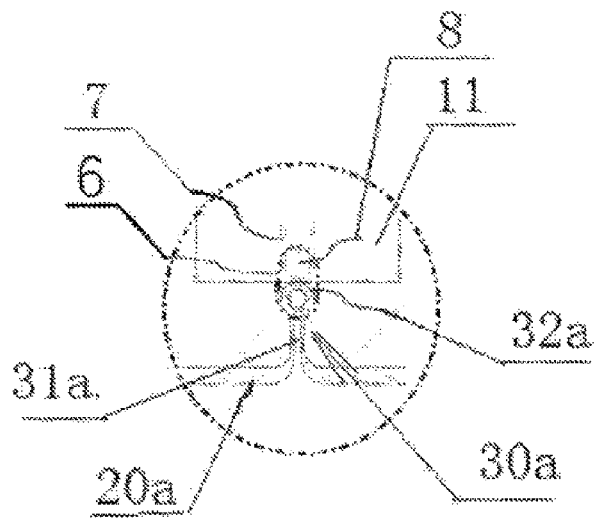
FIG. 14 is an enlarged schematic view of the portion I of FIG. 13.
Figure 15:
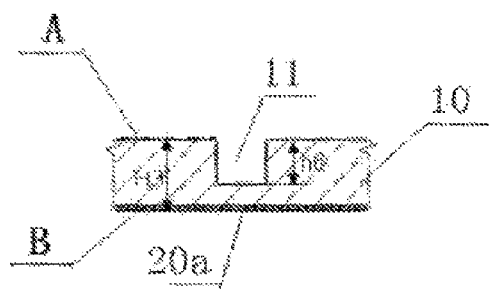
FIG. 15 is a cross-sectional view of a hanging structure+a trim cover fabric bag+a C-shaped ring of the present invention, wherein the cross section doesn't run through a hanging groove.

Referring to FIGS. 13 to 15, in a solution of a hanging structure+a fabric bag 7 (a steel wire 8 passes therethrough)+a C-shaped ring 6 of the present invention, a hanging groove 11 in a foam 10 has a distance to a B side of the foam 10, wherein h5 is the same as that in the previous solution; a hanging groove has a depth of $h6 \geq 10$ mm; and a width of the fabric bag directly ensures the hanging effect, so that h6 may be set lower. A hanging area has a total thickness of $H3=h6+h5$. In order to ensure the hanging effect for the seat assembly, it is recommended that $H3 \geq 15$ mm. The resistance to the pull-out force is provided by the strength of the reinforcement fabric and the steel wire per se, and substantially has no relation with the depth of embedment of the steel wire in the foam. Since this solution comprises a new design of the hanging structure and a new design of the trim cover fixing structure as an optimized design, as compared with H2, H3 saves more space.

Figure 16:
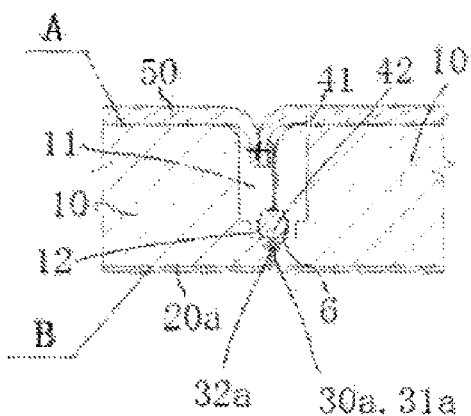
FIG. 16 is a schematic structural view of a hanging system of the present invention achieved by a hanging structure+a trim cover fabric bag+a C-shaped ring.
Figure 17:
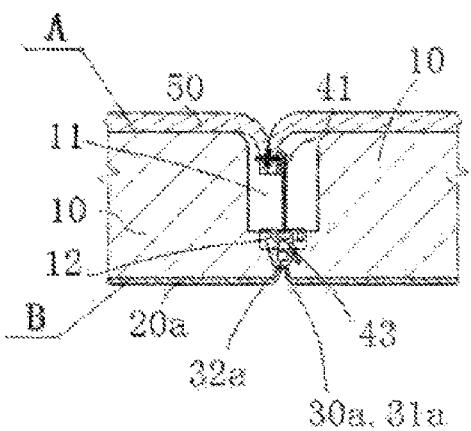
FIG. 17 is a schematic structural view of a hanging system of the present invention achieved by a hanging structure+a trim cover fabric bag+a J-shaped hook.
Figure 18:
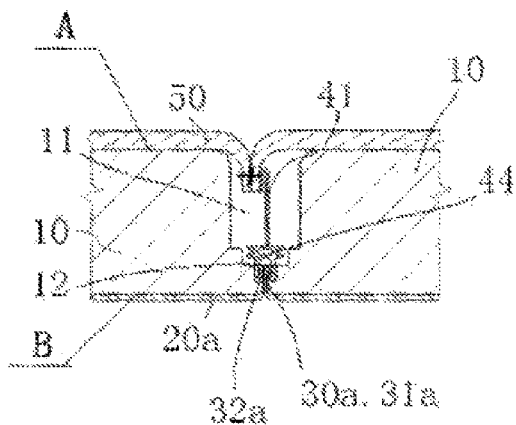
FIG. 18 is a schematic structural view of a hanging system of the present invention achieved by a hanging structure+a trim cover fabric bag+a catch.
Figure 19:
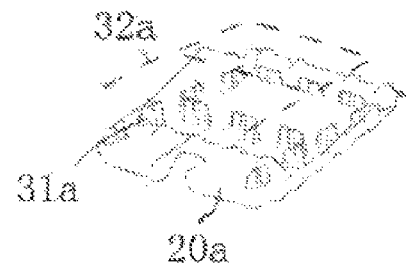
FIG. 19 is a schematic exploded view of a reinforcement fabric and a steel wire of the present invention.
Figure 20:
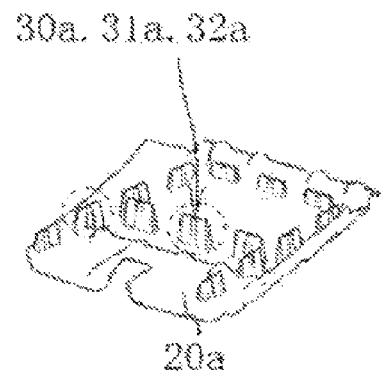
FIG. 20 is a schematic structural view of a reinforcement fabric with a steel wire embedded in the reinforcement fabric according to the present invention.
Figure 21:
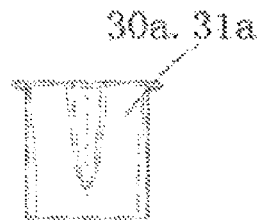
FIG. 21 is a schematic view of a hanging structure according to an embodiment of the present invention, wherein a reinforcement fabric is embedded with a steel wire.
Figure 22:
FIG. 22 is a schematic view of a hanging structure according to another embodiment of the present invention, wherein a reinforcement fabric is embedded with a steel wire.

New hanging structures of the present invention are suitable for a plurality of connection manners with the trim covers. Referring to FIG. 16, a trim cover profile 41 and a hanging structure 30a are linked and held through a "C"-shaped ring 6. The profile 41 may be an extrusion molded part, and may also be embedded with a steel wire 42. The hanging structure 30a is a combination of a steel wire 32a and a reinforcement fabric 31a. Referring to FIG. 17, a trim cover tensioning structure 40 comprises a profile 41 and a "J"-shaped hook 43, wherein the "J"-shaped hook 43 is hooked on a steel wire 32a in a hanging structure 30a. Referring to FIG. 18, a trim cover tensioning structure 40 comprises a trim cover profile 41 and a catch 44, wherein the catch 44 is hooked on a steel wire 32a in a hanging structure 30a.

Referring to FIGS. 19 to 22, reinforcement fabrics 31a of a plurality of hanging structures 30a are arranged on a reinforcement fabric 20a as required, and each reinforcement fabric 31a is embedded with a steel wire 32a.

Figure 23:
FIG. 23 is a top view of FIG. 21.
Figure 24:
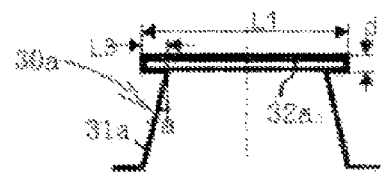
FIG. 24 is a cross-sectional view taken along the line F-F of FIG. 23.
Figure 25:
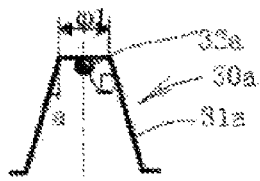
FIG. 25 is a cross-sectional view taken along the line G-G of FIG. 23.

Referring to FIGS. 23 to 25, structural parameters of a hanging structure 30a as shown are as follows:

A steel wire 32a has a length L1 of $20 \text{ mm} \leq L1 \leq 100$ mm; the steel wire 32a protrudes from edges of a reinforcement fabric 31a with a length of protrusion L3 of $5 \text{ mm} \leq L3 \leq 15$ mm; the reinforcement fabric 31a surrounds the steel wire 32a through a surrounding portion with an inner diameter $d \geq 3$ mm; the reinforcement fabric 31a is trapezoidal, where the trapezoid has an upper inner angle of $a \geq 5°$, the upper side of the trapezoid has a width of $\varphi 1 \geq 10$ mm, and the steel wire 32a has a diameter of $D \geq 1$ mm. The values of L3 and d are selected to prevent the steel wire from falling off, The value of the angle a is selected for the demolding process, and the value of $\varphi 1$ is selected to ensure that the reinforcement fabric is reliably positioned in a foaming tool.

Figure 26:
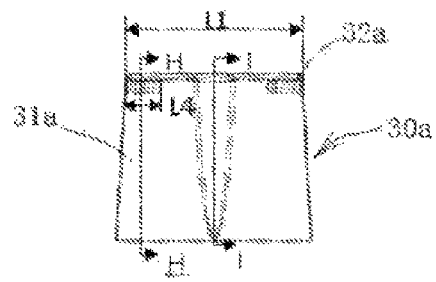
FIG. 26 is a front view of FIG. 22.
Figure 27:
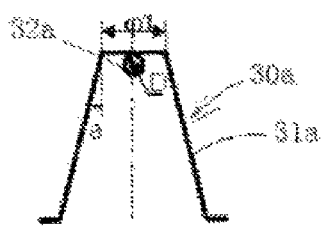
FIG. 27 is a cross-sectional view taken along the line I-I of FIG. 26.
Figure 28:
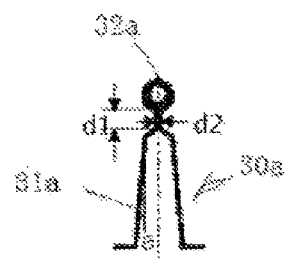
FIG. 28 is a cross-sectional view taken along the line H-H of FIG. 26.

Referring to FIGS. 26 to 28, structural parameters of a hanging structure 30a as shown are as follows:

A steel wire 32a has a length L1 of $20 \text{ mm} \leq L1 \leq 100$ mm; the steel wire 32a is connected with edges of a reinforcement fabric 31a with a connection length L4 of $5 \text{ mm} \leq L4 \leq 25$ mm; $3 \text{ mm} \leq d1 \leq 10$ mm; the reinforcement fabric 31a is trapezoidal; the steel wire 32a has a diameter $D \geq 1$ mm, $0 \leq d2 \leq \frac{1}{2}D$, $a \geq 5°$, $\varphi 1 \geq 10$ mm. The values of L4, d1, d2 are selected to prevent the steel wire from falling off, The value of the angle a is selected for the demolding process, and the value of $\varphi 1$ is selected to ensure that the reinforcement fabric is reliably positioned in a foaming tool.

Figure 29:
FIG. 29 is a schematic structural view of a reinforcement portion according to an embodiment of the present invention.
Figure 30:
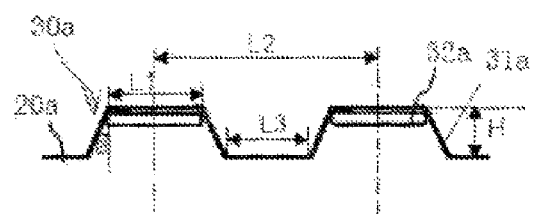
FIG. 30 is a cross-sectional view taken along the line J-J of FIG. 29.

Referring to FIGS. 29 and 30, a distance L2 between two hanging structures 30a is selected according to a shaping style, wherein L3 is the minimum distance between the fastening structures measured at their roots on the reinforcement fabric, wherein $L3 \geq 20$ mm for ensuring the forming process.

Figure 31:
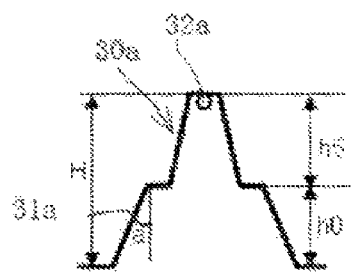
FIG. 31 is a cross-sectional view taken along the line K-K of FIG. 29.

Referring to FIG. 31, a height H of a reinforcement fabric 31a is determined according to a thickness from a bottom of a specific hanging groove to a B side of a foam. In the case of $H \leq 60$ mm, $H=h5$.

Under consideration of the manufacturing forming process of the reinforcement fabric, in the case of $H>60$ mm, the reinforcement fabric 31a is designed in a shape of a two-step trapezoid, where $h5=\frac{1}{3}H$ (and $h5<60$ mm), and $h0=H-h5$.

Figure 32:
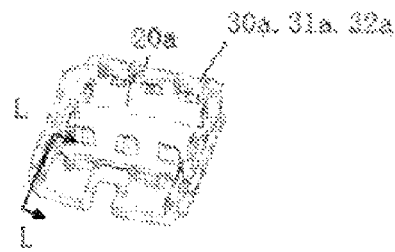
FIG. 32 is a schematic structural view of another embodiment of the present invention.
Figure 33:
FIG. 33 is a cross-sectional view taken along the line L-L of FIG. 32 with a structural layout of a standard wire.
Figure 34:
FIG. 34 is a cross-sectional view taken along the line L-L of FIG. 32 with a structural layout of a non-standard steel wire.

In the case of L3<20 mm, a hanging structure 30*a* may be designed in the structural forms as shown in FIGS. 32, 33 and 34, and a steel wire may be a standard steel wire or a non-standard steel wire according to structural requirements.

Figure 35:
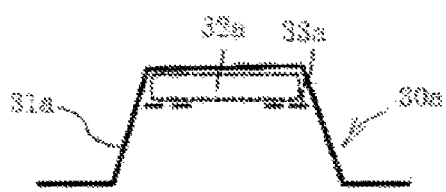
FIG. 35 is a schematic structural view of a reinforcement fabric with an embedded steel wire by stitching with a parallel suture according to the present invention.
Figure 36:
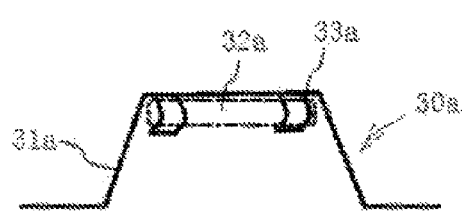
FIG. 36 is a schematic structural view of a reinforcement fabric with an embedded steel wire by stitching with a winding suture according to the present invention.

Referring to FIG. 35, a steel wire 32*a* is stitched in a reinforcement fabric 31*a* by means of a parallel suture 33*a*. Referring to FIG. 36, a steel wire 32*a* is stitched in a reinforcement fabric 31*a* by means of a winding suture 33*a*.

Figure 37:
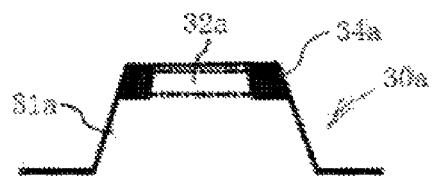
FIG. 37 is a schematic structural view of a reinforcement fabric with an embedded steel wire according to the present invention, wherein the two ends of the steel wire are glued.
Figure 38:
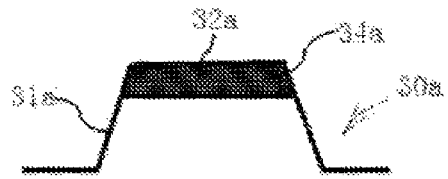
FIG. 38 is a schematic structural view of a reinforcement fabric with an embedded steel wire according to the present invention, wherein the steel wire is glued in its full length.
Figure 39:
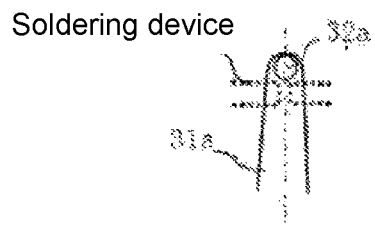
FIG. 39 is a schematic structural view of a reinforcement fabric with an embedded steel wire by soldering or heat seal according to the present invention (before soldering or heat seal).
Figure 40:
FIG. 40 is a structural schematic view of the reinforcement fabric with the embedded steel wire by soldering or heat seal according to the present invention (after soldering or heat seal).
Figure 41:
FIG. 41 is a cross-sectional view taken along the line M-M of FIG. 40.
Figure 42:
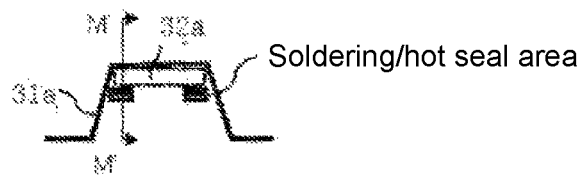
FIG. 42 is another structural schematic view of a reinforcement fabric with an embedded steel wire by soldering or heat seal according to the present invention (after soldering or heat seal).
Figure 43:
FIG. 43 is a cross-sectional view taken along the line M'-M' of FIG. 42.
Figure 44:
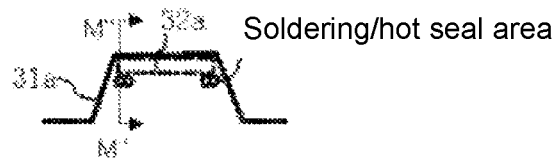
FIG. 44 is another structural schematic view of a reinforcement fabric with an embedded steel wire by soldering or heat seal according to the present invention (after soldering or heat seal).
Figure 45:
FIG. 45 is a cross-sectional view taken along the line M"-M" of FIG. 44.

Referring to FIG. 37, a steel wire 32*a* is fixed in a reinforcement fabric 31*a* in a way that it's glued at two ends by an adhesive 34*a* (an ordinary adhesive or a hot-melt adhesive). Referring to FIG. 38, a steel wire 32*a* is fixed in a reinforcement fabric 31*a* in a way that it's glued in its full length by an adhesive 34*a* (an ordinary adhesive or a hot-melt adhesive).

A gluing method by using a hot-melt glue may have the following steps: 1) a hot-melt adhesive film is attached to a surface of a steel wire 32*a*; 2) the steel wire 32*a* is pressed into a reinforcement fabric 31*a*; 3) terminals of a heating device clamp two ends of the steel wire 32*a*, and hot-melt adhesion is performed; or a hot-melt adhesive is applied after the steel wire 32*a* is embedded, and then hot-melt adhesion is performed.

Referring to FIGS. 39 to 45, a steel wire 32*a* is embedded in a reinforcement fabric 31*a* through soldering by a welding device or through heat seal.

Figure 46:
FIG. 46 is a schematic view of a standard part (a formed reinforcement fabric) of a first hanging structure of the present invention.
Figure 47:
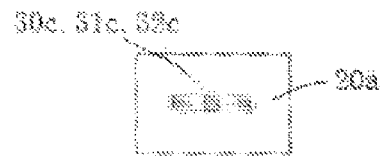
FIG. 47 is a top view of FIG. 46.

Referring to FIGS. 46 and 47, a hanging structure 30*c* may be a standard part comprising a reinforcement fabric 31*c* embedded with a steel wire 32*c*, which is produced in a hot-press forming process, wherein the material of a reinforcement fabric 20*a* is PET, PP or PE, or a compound material.

Figure 48:
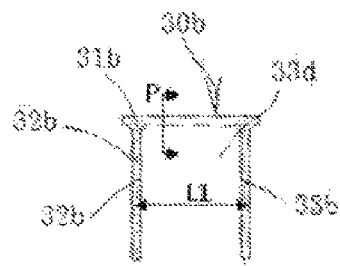
FIG. 48 is a schematic view of a standard part (an injection molded plastic part) of a second hanging structure of the present invention.
Figure 49:
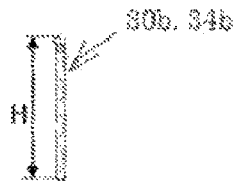
FIG. 49 is a side view of FIG. 48.

Referring to FIGS. 48 and 49, a hanging structure 30*b* as shown is a plastic part in a shape of "Π" with a horizontal rod 31*b* and a pair of vertical rods 32*b*, 33*b* integrally connected with the horizontal rod 31*b*, wherein free ends of the pair of vertical rods 32*b* and 33*b* are connected to a side of a reinforcement fabric 20*b* facing a foam 10*b*. The plastic part has a hook hole 34*b* for connection with a trim cover profile. The plastic part is an injection molded standard part with a standard diameter of D≥3 mm, and may be embedded with a steel wire 32*b* (its diameter≥1 mm), or may be inject molded with a plastic material mixed with iron powder, wherein the material is PP or PE or ABS, L1≥20 mm, and the minimum H≥2D.

Figure 50:
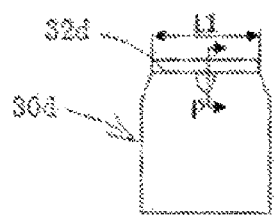
FIG. 50 is a schematic view of a standard part of a third hanging structure of the present invention (an extrusion molded part with a double-layer fabric).
Figure 51:
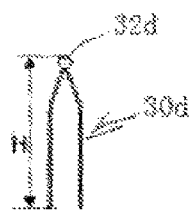
FIG. 51 is a side view of FIG. 50.
Figure 52:
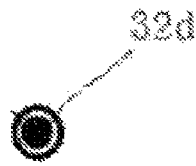
FIG. 52 is a cross-sectional view taken along the line P-P of FIG. 50.

Referring to FIGS. 50 and 52, a hanging structure 30*d* is an extrusion molded standard part with a two-layer fabric. The materials may be PP or PE and a non-woven fabric. The diameter D≥3 mm. It may be embedded with a steel wire 32*d* (its diameter≥1 mm), or it may be injection molded with a plastic material mixed with iron powder, where L1≥20 mm, and the minimum H≥2D.

Figure 53:
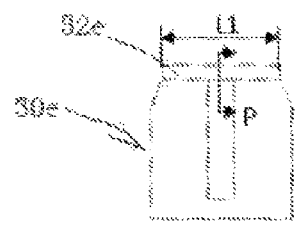
FIG. 53 is a schematic view of a standard part of a fourth hanging structure of the present invention (an extrusion molded part with a single-layer fabric).
Figure 54:
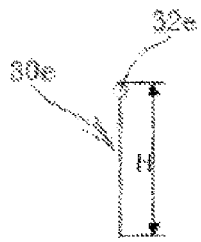
FIG. 54 is a side view of FIG. 53.
Figure 55:
FIG. 55 is a cross-sectional view taken along the line P-P of FIG. 53.

Referring to FIGS. 53 and 55, a hanging structure 30*e* is an extrusion molded standard part with a single-layer fabric. It may be embedded with iron powder 32*e*. As compared with the extrusion molded standard part with the two-layer fabric, a layer of non-woven fabric is spared. Other aspects are same as those in the case of the two-layer fabric.

Figure 56:
FIGS. 56 to 62 are schematic views of a joining process for connecting a hanging structure with a reinforcement fabric according to the present invention.
Figure 57:
Figure 58:
Figure 59:
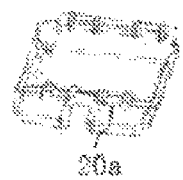
Figure 60:
Figure 61:
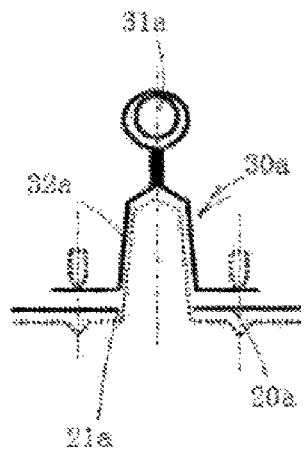
Figure 62:
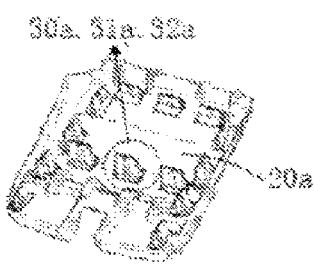
Figure 63:
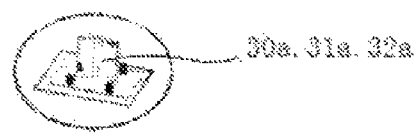
FIG. 63 is a schematic specifically enlarged view of a local area after connection.

A hanging structure 30*a* and a reinforcement fabric 20*a* are formed together in a fabric-to-fabric connection. The specific process may be as follows: 1) Referring to FIGS. 56 and 58, reinforcement fabrics 31*a* for the hanging structures 30*a* are formed, and then steel wires 31*a* are embedded in the reinforcement fabrics 31*a*; 2) Referring to FIGS. 59 and 60, the reinforcement fabric 20*a* is formed, and is tailored, and positioning holes 21*a* and functional notches are punched, which correspond to a various shape of an A side of a foam and various hanging positions, wherein the separate hanging structures 30*a* are combined with the reinforcement fabric 20*a* as a platform, so that it is possible to flexibly apply different shapes; 3) Referring to FIGS. 61 to 63, the hanging structures 30*a* and the reinforcement fabric 20*a* are connected by stitching, adhesion, soldering or heat seal.

Figure 64:
FIGS. 64 to 69 are schematic views of a process for connecting another hanging structure with a reinforcement fabric according to the present invention, wherein the connection is a fabric-to-fabric connection.
Figure 65:
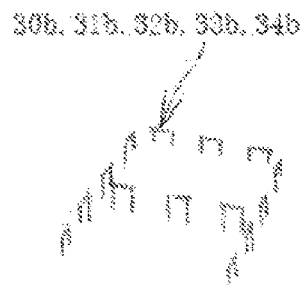
Figure 66:
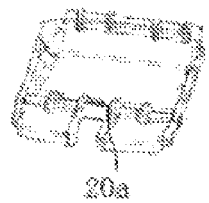
Figure 67:
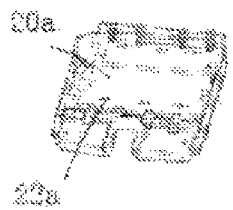
Figure 68:
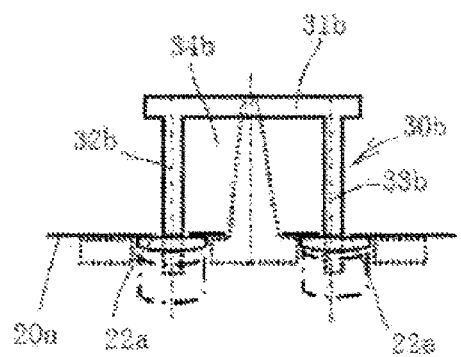
Figure 69:
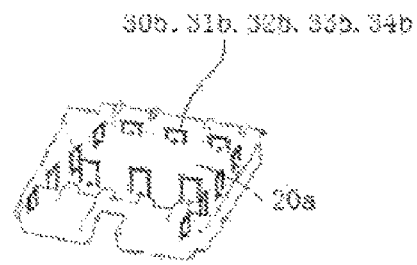

A hanging structure 30*b* and a reinforcement fabric 20*a* are formed together in a fabric-to-fabric connection. The specific process may be as follows: 1) Referring to FIGS. 64 and 65, plastic parts of hanging structures 30*b* are formed; 2) Referring to FIGS. 66 and 67, a reinforcement fabric 20*a* is formed, and is tailored, and positioning holes 21*a* and functional notches are punched, wherein the notches correspond to a various shape of an A side of a foam and various hanging positions, wherein the separate hanging structures 30*a* are combined with the reinforcement fabric 20*a* as a platform, so that it is possible to flexibly apply different shapes; 3) Referring to FIGS. 68 to 69, two vertical rods 32*b*, 33*b* of the respective plastic part of the hanging structure 30*b* and the positioning holes 22*a* of the reinforcement fabric 20*a* are connected by hot-melt riveting.

Figure 70:
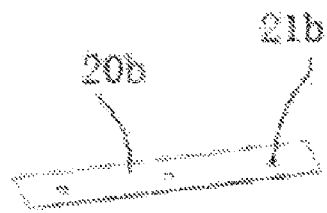
FIGS. 70 to 72 are schematic views of a process for connecting a conventional reinforcement fabric with a standardized hanging structure.
Figure 71:
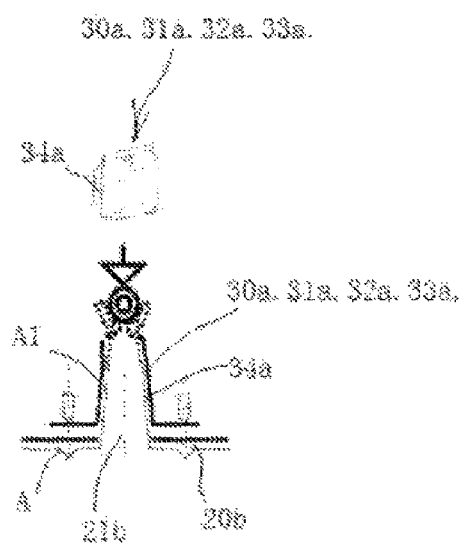
Figure 72:
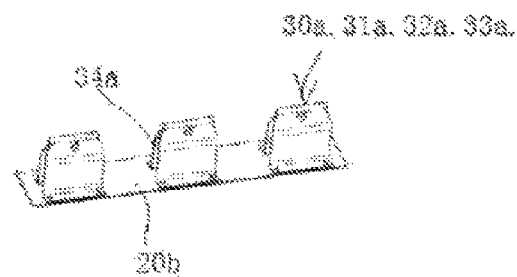

A specific process for connecting a hanging structure 30*a* with an ordinary reinforcement fabric 20*b* may be as follows: 1) Referring to FIG. 70, the ordinary reinforcement fabric 20*b* is provided with an outer contour as well as functional notches and positioning holes 21*b* by punching; 2) Referring to FIGS. 71 and 72, the hanging structure 30*a* is connected with the ordinary reinforcement fabric 20*b* by using soldering/heat seal/hot-melt riveting/stitching/adhesion in a way same to that in the case of the formed reinforcement fabric. A positioning groove 34*a* is provided in the reinforcement fabric 31*a* for the hanging structure 30*a* for facilitating the positioning of the reinforcement fabric 31*a* in a tool A, wherein the positioning groove 34*a* opens at a side facing the tool, so that a positioning fabric A1 in the tool A may be inserted into the positioning groove 34*a*, so as to position the reinforcement fabric 31*a*.

Figure 73:
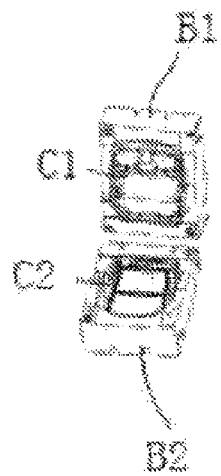
FIG. 73 is a schematic view of placing an insert in a known forming tool.
Figure 74:
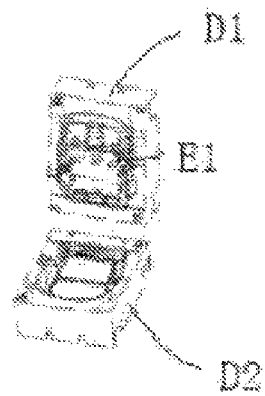
FIG. 74 is a schematic view of placing an insert in a foaming tool of the present invention.

Referring to FIG. 73, in a conventional foaming method, a reinforcement fabric C1 is placed in an upper tool part B1, and four steel wires C2 are placed in a lower tool part B2, and then the tool is closed for casting and foaming. Referring to FIG. 74, in the present invention, only in an upper tool part D1, a reinforcement fabric E1 containing a hanging structure of the present invention needs to be placed, and a lower tool part D2 needs not to be placed with an insert. The present invention may reduce the amount of inserts in the foam, optimize the foaming process, and reduce the management cost and the production cost.

The invention claimed is:
1. A seat portion comprising:
   a foam having an A side and a B side opposite to the A side,
   a trim cover at the A side of the foam,
   a first reinforcement fabric at the B side of the foam,
   a hanging structure, and
   a trim cover tensioning structure,
   wherein the hanging structure tensions the trim cover at a fixing point of the trim cover through the trim cover tensioning structure,
   wherein the hanging structure (a) is directly provided on the first reinforcement fabric at a hanging position, (b) protrudes from a side of the first reinforcement fabric facing the B side of the foam, and (c) extends towards the A side of the foam, and wherein the foam has a hanging groove which opens towards the trim cover, wherein the hanging structure passes through the foam and extends into the hanging groove.

2. The seat portion as recited in claim 1, wherein the hanging structure comprises a second reinforcement fabric embedded with a steel wire, wherein the second reinforcement fabric is directly formed by the first reinforcement fabric at the side of the first reinforcement fabric facing the B side of the foam, or wherein the second reinforcement fabric is formed and then is joined with the formed first reinforcement fabric.

3. The seat portion as recited in claim 2, wherein a plurality of hanging structures is arranged on the first reinforcement fabric, wherein each of the hanging structures is corresponds to a respective hanging position on the first reinforcement fabric and a fixing point of the trim cover.

4. The seat portion as recited in claim 2, wherein a seat backrest of the seat comprises the foam, the trim cover, the first reinforcement fabric, the hanging structure and the trim cover tensioning structure.

5. The seat portion as recited in claim 2, wherein a seat cushion of the seat comprises the foam, the trim cover, the first reinforcement fabric, the hanging structure and the trim cover tensioning structure.

6. A method for producing the seat portion of the seat as recited in claim 2, comprising steps of:
placing the first reinforcement fabric with the hanging structure to an upper tool part of a foaming tool having the upper tool part and a lower tool part, wherein the lower tool part is not placed with an insert,
closing the foaming tool and then casting and foaming in the foaming tool to form the foam of the seat, wherein the foam has an A side and a B side opposite to the A side, wherein the first reinforcement fabric with the hanging structure is joined with the foam, wherein the hanging structure is directly provided on the first reinforcement fabric at a hanging position, protrudes from a side of the first reinforcement fabric facing the B side of the foam, and extends towards the A side of the foam.

7. The method as recited in claim 6, wherein the hanging structure has a positioning groove for positioning the hanging structure in the foaming tool, and the upper tool part has a positioning feature, wherein the method comprises: inserting the positioning feature into the positioning groove, and then positioning the first reinforcement fabric in the foaming tool.

8. The seat portion as recited in claim 2, wherein the steel wire is embedded in the second reinforcement fabric by one of gluing with an adhesive, stitching, soldering, or heat seal.

9. The seat portion as recited in claim 8, wherein the trim cover tensioning structure comprises a trim cover profile connected with the trim cover, and one of a "C"-shaped ring, a "J"-shaped hook, or a catch held on the steel wire.

10. The seat portion as recited in claim 8, wherein the hanging structure has a longitudinal section and a cross section in a trapezoidal shape or a stepped trapezoidal shape, the stepped trapezoidal shape having two lateral sides, wherein each of the two lateral sides of the stepped trapezoidal shape has a step.

11. The seat portion as recited in claim 8, wherein the steel wire with a length L1 of 20 mm≤L1≤100 mm extends outside two sides of the second reinforcement fabric with a protrusion amount L3 of 5 mm<L3≤15 mm.

12. The seat portion as recited in claim 2, wherein the hanging structure is in a shape of "Π" with a horizontal rod and a pair of vertical rods integrally connected with the horizontal rod, wherein free ends of the pair of vertical rods are connected to the first reinforcement fabric.

13. The seat portion as recited in claim 2, wherein the hanging structure is a prefabricated standard part which is connected with the first reinforcement fabric.

14. The seat portion as recited in claim 2, wherein the hanging structure has a positioning groove for positioning the hanging structure in a foaming tool.

15. The seat portion as recited in claim 1, wherein a hanging window follows the hanging groove at a bottom of the hanging groove.

* * * * *